(12) United States Patent
Hajati et al.

(10) Patent No.: US 9,966,825 B2
(45) Date of Patent: May 8, 2018

(54) HAPTIC ACTUATOR INCLUDING SLIDABLY COUPLED MASSES INCLUDING COILS AND RELATED METHODS

(71) Applicant: APPLE INC., Cupertino, CA (US)

(72) Inventors: Arman Hajati, Cupertino, CA (US); Jonah A. Harley, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 362 days.

(21) Appl. No.: 14/858,754

(22) Filed: Sep. 18, 2015

(65) Prior Publication Data

US 2017/0085165 A1   Mar. 23, 2017

(51) Int. Cl.
| | |
|---|---|
| *H02K 33/02* | (2006.01) |
| *G06F 3/01* | (2006.01) |
| *G06F 3/02* | (2006.01) |
| *H04M 19/04* | (2006.01) |
| *G06F 1/16* | (2006.01) |

(52) U.S. Cl.
CPC ............ *H02K 33/02* (2013.01); *G06F 3/016* (2013.01); *G06F 3/02* (2013.01); *H04M 19/047* (2013.01); *G06F 1/163* (2013.01)

(58) Field of Classification Search
CPC ................................ H02K 33/02; H02K 33/12
See application file for complete search history.

(56) References Cited

U.S. PATENT DOCUMENTS

| | | | |
|---|---|---|---|
| 7,288,863 B2 * | 10/2007 | Kraus | B26B 19/282 |
| | | | 310/37 |
| 8,169,402 B2 | 5/2012 | Shahoian et al. | |
| 2007/0145840 A1 * | 6/2007 | Ki | H02K 5/1672 |
| | | | 310/81 |
| 2014/0197936 A1 | 7/2014 | Biggs et al. | |
| 2015/0109223 A1 | 4/2015 | Kessler et al. | |

(Continued)

FOREIGN PATENT DOCUMENTS

| | | |
|---|---|---|
| AU | 2015100710 | 7/2015 |
| WO | 2013169299 A1 | 11/2013 |

(Continued)

OTHER PUBLICATIONS

Product Specification Sheet: Geeplus, VIBRO1 Vibration Actuator, 2 pages, www.geeplus.biz, downloaded on Jul. 15, 2015.
Hajati, Arman, U.S. Appl. No. 14/858,710, filed Sep. 18, 2015.

Primary Examiner — Dang Le
(74) Attorney, Agent, or Firm — Allen, Dyer, Doppelt + Gilchrist, P.A.

(57) ABSTRACT

A haptic actuator may include a housing having a top and a bottom, and first and second permanent magnets carried by the top and bottom, respectively, of the housing. The haptic actuator may also include a field member carried by the housing. The field member may include a coil between the first and second permanent magnets, first and second ends, and a first mass between the first end and the coil, and a second mass between the second end and the coil. A first shaft may slidably couple the first mass to the housing, and a second shaft may slidably couple the second mass to the housing. The haptic actuator may also include a first set of biasing members between the first end of the field member and the housing and a second set of biasing members between the second end of the field member and the housing.

21 Claims, 9 Drawing Sheets

(56) References Cited

U.S. PATENT DOCUMENTS

2015/0116205 A1    4/2015  Westerman et al.
2015/0130730 A1    5/2015  Harley et al.
2017/0317568 A1*  11/2017  Ishii .......................... B06B 1/02

FOREIGN PATENT DOCUMENTS

| WO | 2013169303 A1 | 11/2013 |
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

HAPTIC ACTUATOR INCLUDING SLIDABLY COUPLED MASSES INCLUDING COILS AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing having a top and a bottom, and first and second permanent magnets carried by the top and bottom, respectively, of the housing. The haptic actuator may also include a field member carried by the housing. The field member may include at least one coil between the first and second permanent magnets, first and second ends, and a first mass between the first end and the at least one coil, and a second mass between the second end and the at least one coil. The haptic actuator may also include a first shaft may slidably couple the first mass to the housing, and a second shaft may slidably couple the second mass to the housing. The haptic actuator may also include a first set of biasing members between the first end of the field member and the housing and a second set of biasing members between the second end of the field member and the housing. Accordingly, the haptic actuator may provide increased force haptic feedback and occupy less space in an electronic device, for example, be relatively smaller in terms of height.

The at least one coil may be a loop shaped coil, for example. The field member may include a third mass between the first and second masses and having a reduced width relative to the first and second masses. The at least one coil may be a plurality of coils carried adjacent the third mass, for example.

The haptic actuator may also include first and second mechanical bearings carried by the first and second masses and slidably receiving the first and second shafts. The housing may include at least one sidewall between the top and bottom and comprising at least one non-ferritic material, for example. The top and bottom may each include ferritic material.

The haptic actuator may also include a mechanical stiffener carried by one of the top and bottom of the housing. The first and second sets of biasing members may include first and second sets of springs, for example.

The first and second ends of the field member may include first and second sets of protrusions coupled to the first and second sets of biasing members, respectively. Each of the first and second sets of biasing members may each have an equal number thereof between a respective one of the first and second ends and adjacent portions of the housing, for example.

An electronic device aspect is directed to electronic device that may include a device housing and wireless communications circuitry carried by the device housing. The electronic device may also include a haptic actuator carried by the device housing and that may include an actuator housing having a top and a bottom, first and second permanent magnets carried by the top and bottom, respectively, of the actuator housing, and a field member carried by the actuator housing. The field member may include at least one coil between the first and second permanent magnets, first and second ends, and a first mass between the first end and the at least one coil, and a second mass between the second end and the at least one coil. The haptic actuator may also include a first shaft slidably coupling the first mass to the actuator housing, a second shaft slidably coupling the second mass to the actuator housing, a first set of biasing members between the first end of the field member and the actuator housing, and a second set of biasing members between the second end of the field member and the actuator housing. A controller may be to the wireless communications circuitry and the haptic actuator capable of performing at least one wireless communication function and selectively operating the haptic actuator.

A method aspect is directed to a method of making a haptic actuator. The method may include positioning first and second permanent magnets to be carried by a top and a bottom, respectively, of a housing and positioning a field member to be carried by the housing. The field member includes at least one coil between the first and second permanent magnets, first and second ends, and a first mass between the first end and the at least one coil, and a second mass between the second end and the at least one coil. The method may also include slidably coupling the first mass to the housing using a first shaft and slidably coupling the second mass to the housing using a second shaft. The method may further include positioning a first set of biasing members between the first end of the field member and the housing and positioning a second set of biasing members between the second end of the field member and the housing.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and multiple prime notations are used to refer to like elements in different embodiments.

Figure 1:
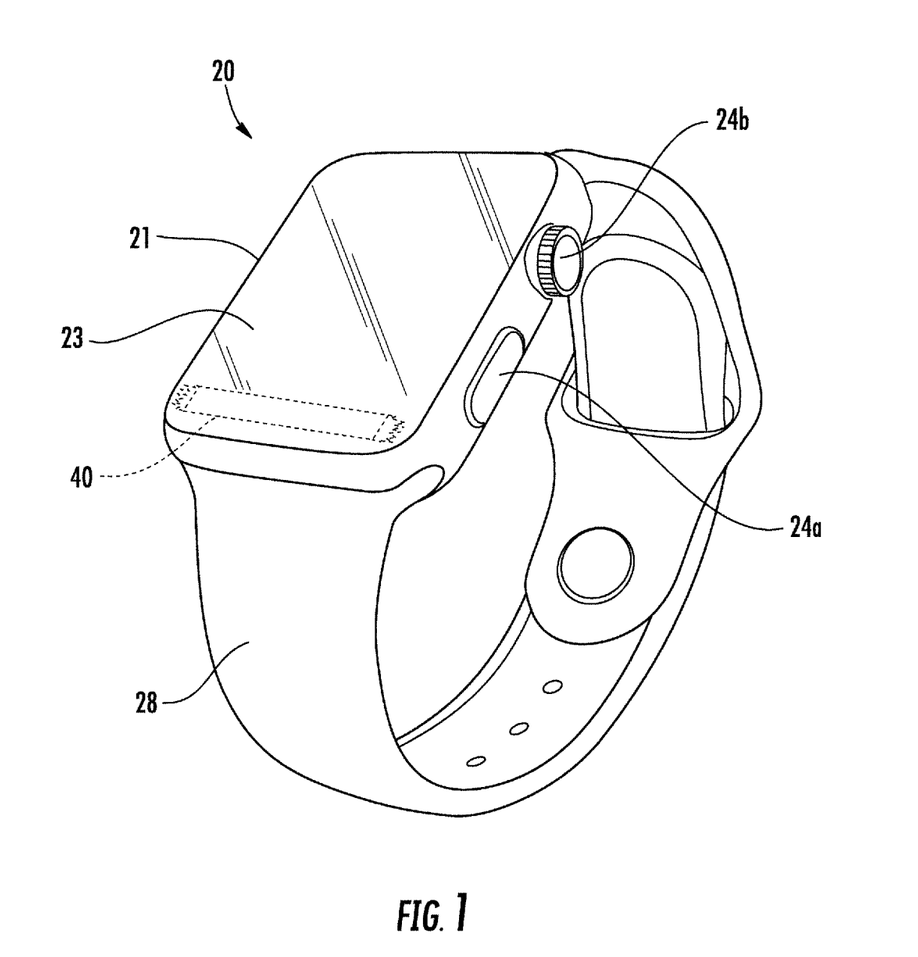
FIG. 1 is a perspective view of an electronic device including a haptic actuator according to an embodiment of the present invention.
Figure 2:
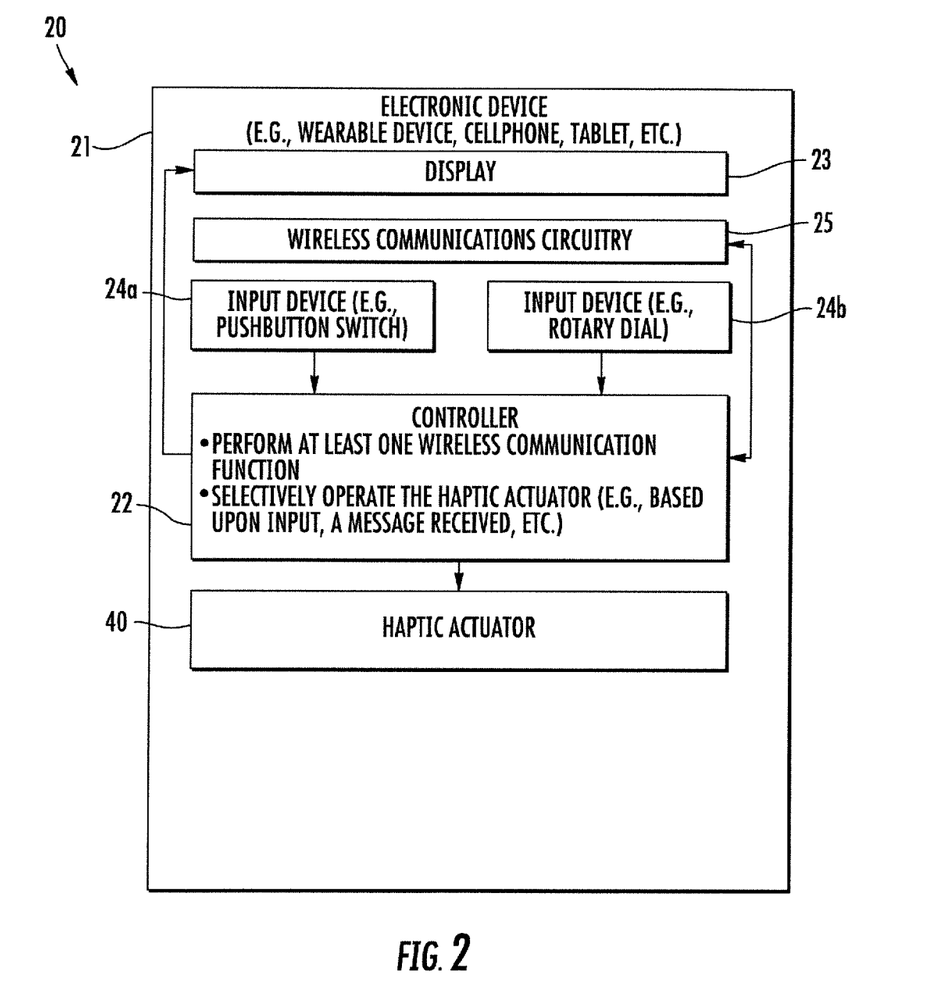
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a liquid crystal display (LCD), for example, or may be another type of display, as will be appreciated by those skilled in the art.

Finger-operated user input devices 24a, 24b, illustratively in the form of a pushbutton switch and a rotary dial are also carried by the device housing 21 and is coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the controller 22 applies a voltage to move a moveable body or masses between first and second positions in a y-axis.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Figure 3:
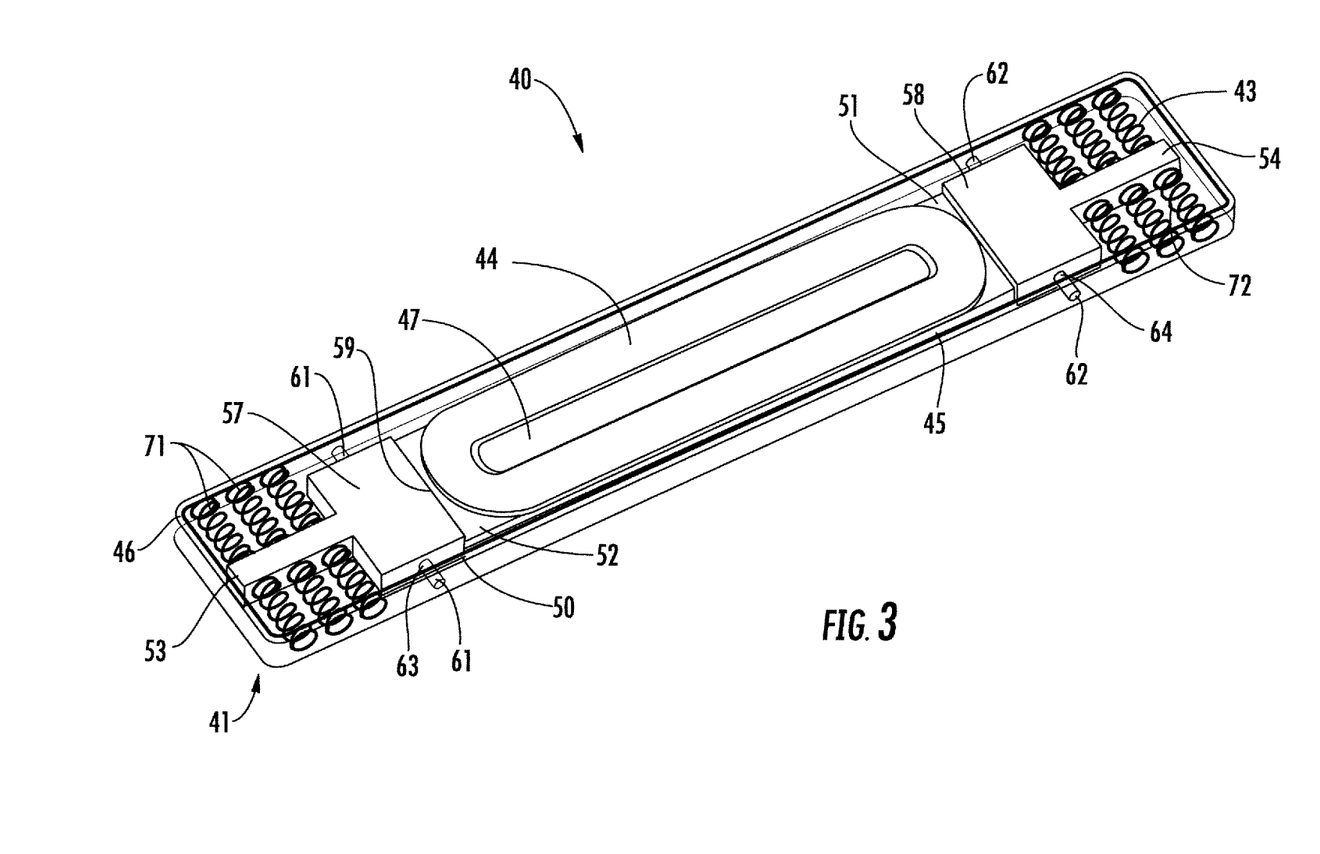
FIG. 3 is a perspective view of a portion of the haptic actuator of FIG. 1.
Figure 4:
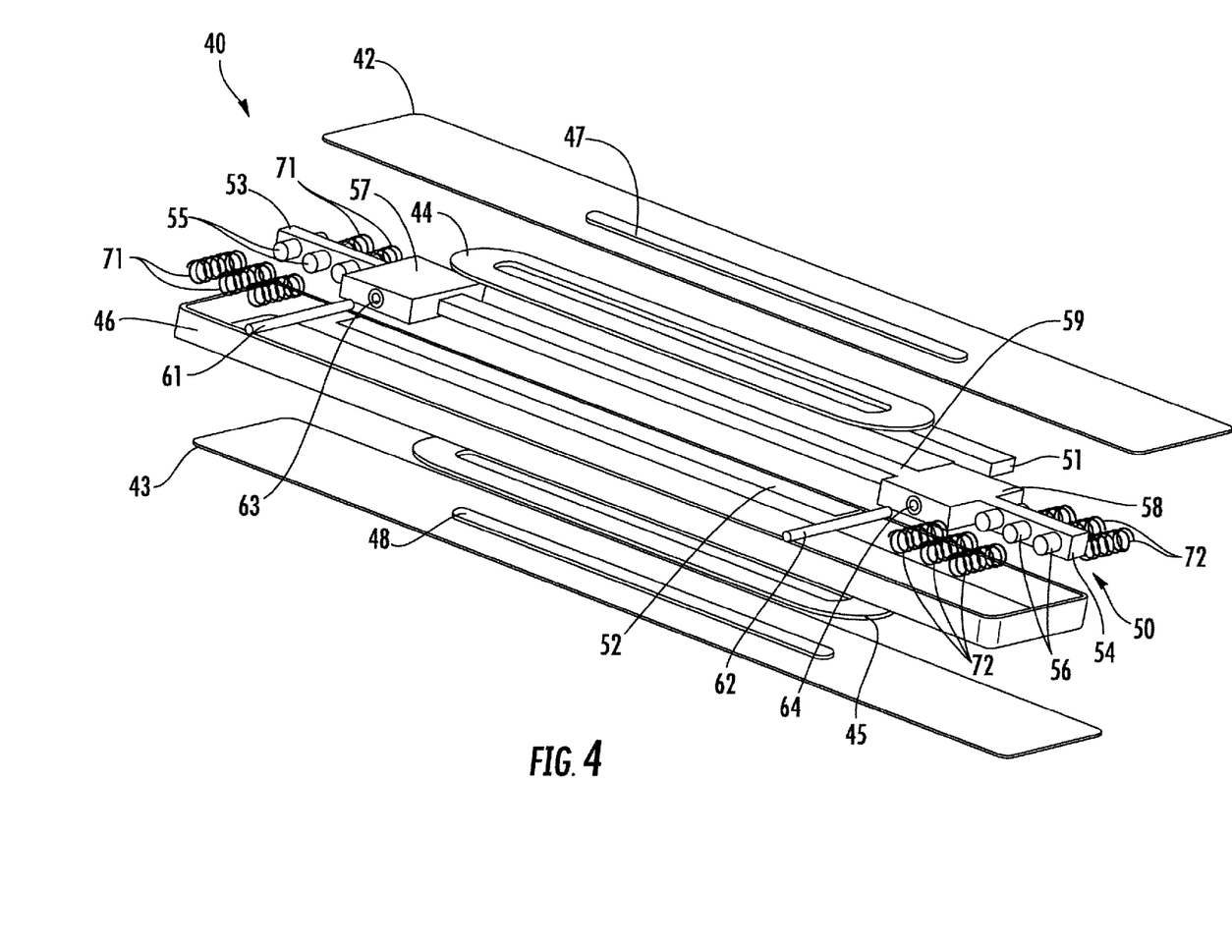
FIG. 4 is an exploded perspective view of the haptic actuator of FIG. 3.

Referring now additionally to FIGS. 3-4, the haptic actuator 40 includes a housing 41 having a top 42 and a bottom 43. The top 42 and bottom 43 of the housing 41 may be ferritic, for example, to increase efficiency. The housing 41 also includes a sidewall 46 that may include non-ferritic material to reduce effects on the magnetic field, as will be described in further detail below. The housing 41 has a rectangular shape. Exemplary dimensions may be 70 mm in length, 12 mm in width and 2.6 mm in height. Of course, the housing 41 can be another shape and have different dimensions. Moreover, while specific portions of the housing 41 are being described with respect to ferritic and non-ferritic materials, it should be understood that all or some of the housing may include ferritic material or be ferritic, or the housing may include a combination of ferritic and non-ferritic materials.

Respective mechanical stiffeners 47, 48 may be carried by the top 42 and bottom 43 of the housing 41. Each mechanical stiffener 47, 48 may be non-ferritic, and more particularly, non-ferritic steel. Any number of mechanical stiffeners may be used, including none, and may be carried by any portion of the housing 41. The mechanical stiffeners 47, 48 may be another type of material.

The haptic actuator 40 also includes first and second coils 44, 45 (i.e., electrical coils) carried by the top and bottom 42, 43, respectively, of the housing 41. The first and second coils 44, 45 each illustratively have a loop shape or "racetrack" shape and are aligned in a stacked relation and spaced apart.

The haptic actuator 40 may also include a field member 50 carried by the housing. The field member 50 illustratively includes permanent magnets 51, 52 between the first and second coils 44, 45 and is movable within the housing 41. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The permanent magnets 51, 52 may be neodymium, for example, and may be positioned with in opposing directions with respect to their respective poles. The permanent magnets 51, 52 also have a rectangular shape and are aligned along a length of the first and second coils 44, 45. While a pair of rectangular shaped permanent magnets is illustrated, it will be appreciated that there may be any number of permanent magnets having any shape between the first and second coils 44, 45.

The field member 50 also includes first and second ends 53, 54. The first and second ends 53, 54 have first and second sets of protrusions 55, 56 for coupling to first and second sets of biasing members 71, 72, respectively, as will be described in further detail below. The first and second sets of protrusions 55, 56 are illustratively in the form of circular protrusions and extend outwardly in opposing directions. An equal number of protrusions may extend in each direction.

The field member 50 includes a first mass 57 is between the first end 53 and the permanent magnets 51, 52. A second mass 58 is between the second end 54 and the pair of permanent magnets 51, 52. A third mass 59 extends between the first and second masses 57, 58. The third mass 59 has a reduced width relative to the first and second masses 57, 58. This permits the permanent magnets 51, 52 to be on each side of the third mass 59. In some embodiments, a third mass 59 may not be included and/or the third mass may have a different shape, for example. Each of the first, second, and third masses 57, 58, 59 may be tungsten, for example. The first, second, and third masses base may each be a different material.

The first, second, and third masses 57, 58, 59 which collectively may be referred to as the "moving part," are spaced from the first and second coils 44, 45 by a relatively small gap. In other words, the first and second coils 44, 45 do not touch the first, second, and third masses 57, 58, 59.

The haptic actuator 40 also includes a first shaft 61 slidably coupling the first mass 57 to the housing 41, A second shaft 62 slidably couples the second mass 58 to the housing 41. The first and second shafts 61, 62 may be a nickel-chromium alloy, for example. The first and second shafts 61, 62 may be generally parallel to each other, and as will be appreciated by those skilled in the art, may limit motion to a desired translational movement that may be parallel to y-axis (width). The first and second shafts 61, 62 may also limit movement in other directions, for example, lateral movement, rotation, and/or wobbling with respect to prior art haptic actuators. The first and second shafts 61, 62 may be particularly advantageous lower frequency operation, for example, 110-200 Hz and, more specifically, 70-200 Hz.

First and second mechanical bearings 63, 64 are carried by the first and second masses 57, 58 and slidably receive the first and second shafts. The first and second mechanical bearings 63, 64 may be slot bearings.

It will be appreciated by those skilled in the art that the first and second shafts 61, 62 may be sliding with respect to a combination of circular and slot bearings 63, 64 so that unwanted directions of force may be constrained while reducing the chances of jamming due to over-constraint. The first and second mechanical bearings may be mounted such that they are mounted on the moving mass 57, 58, 59 (and hence the shafts 61, 62 are fixed to the housing 41) or mounted on the housing (and hence the shafts are fixed to the moving mass).

The haptic actuator 40 also includes a first set of biasing members 71 between the first end 53 of the field member 50 and the housing 41 and a second set of biasing members 72 between the second end 54 of the field member and the housing. The first and second sets of biasing members 71, 72 may be spring, for example, and more particularly, coil and/or leaf springs and may be steel. The first and second sets of biasing members 71, 72 may be other types of biasing members and may be another material. As noted above, the first, second, and third masses are spaced from the first and second coils 44, 45. The first and second sets of biasing members 71, 72 assist in maintaining this spacing, and increase stiffness. While twelve (12) total biasing members are shown in the form of coil springs (i.e., mechanical coils), it should be understood that any number and type of biasing members may be used. Each of the first and second sets of biasing members 71, 72 may each have an equal number thereof between a respective one of the first and second ends 53, 54 and adjacent portions of the housing, for example.

The haptic actuator 40 described herein may provide relatively more momentum in a smaller package or housing. A smaller size of the housing, particularly with respect to height or z-axis direction, may become increasingly desirable as electronic devices become smaller, yet it may be desirable to maintain or increase the strength of the haptic feedback (i.e., momentum than 2000 g/mm/sec).

Figure 5:
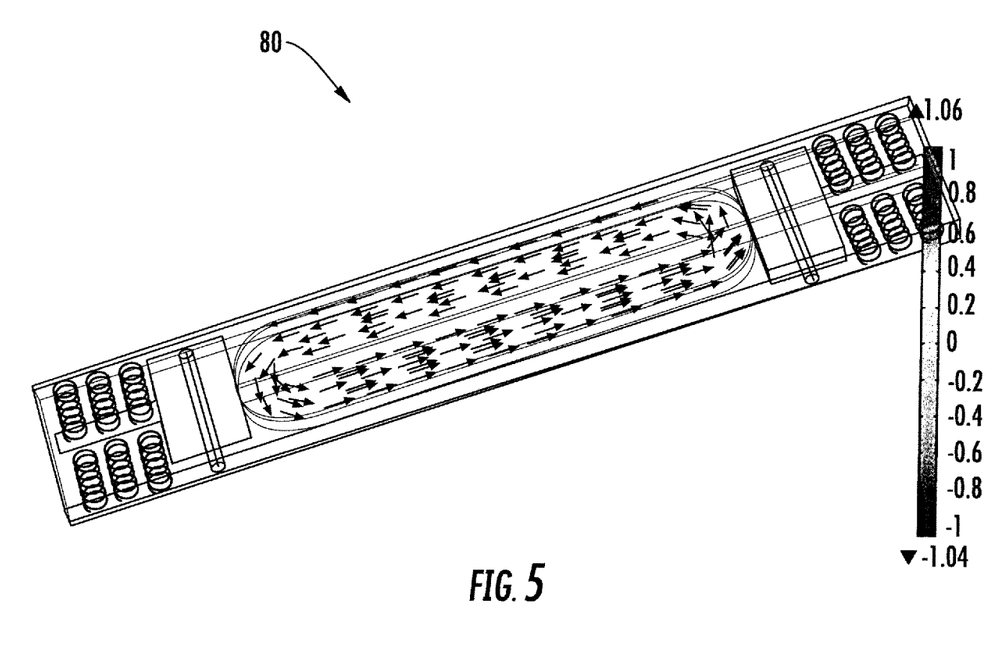
FIG. 5 is an electromagnetic simulation diagram of the haptic actuator of FIG. 3.

Referring now to current map 80 in FIG. 5, an electromagnetic simulation for the haptic actuator 40 is illustrated. The arrows indicate current flow direction and at the arrow surface, relative current density. Illustratively, the haptic actuator 40, based upon the relative current density and the relative magnetic flux density, has a relatively high efficiency.

Figure 6A:
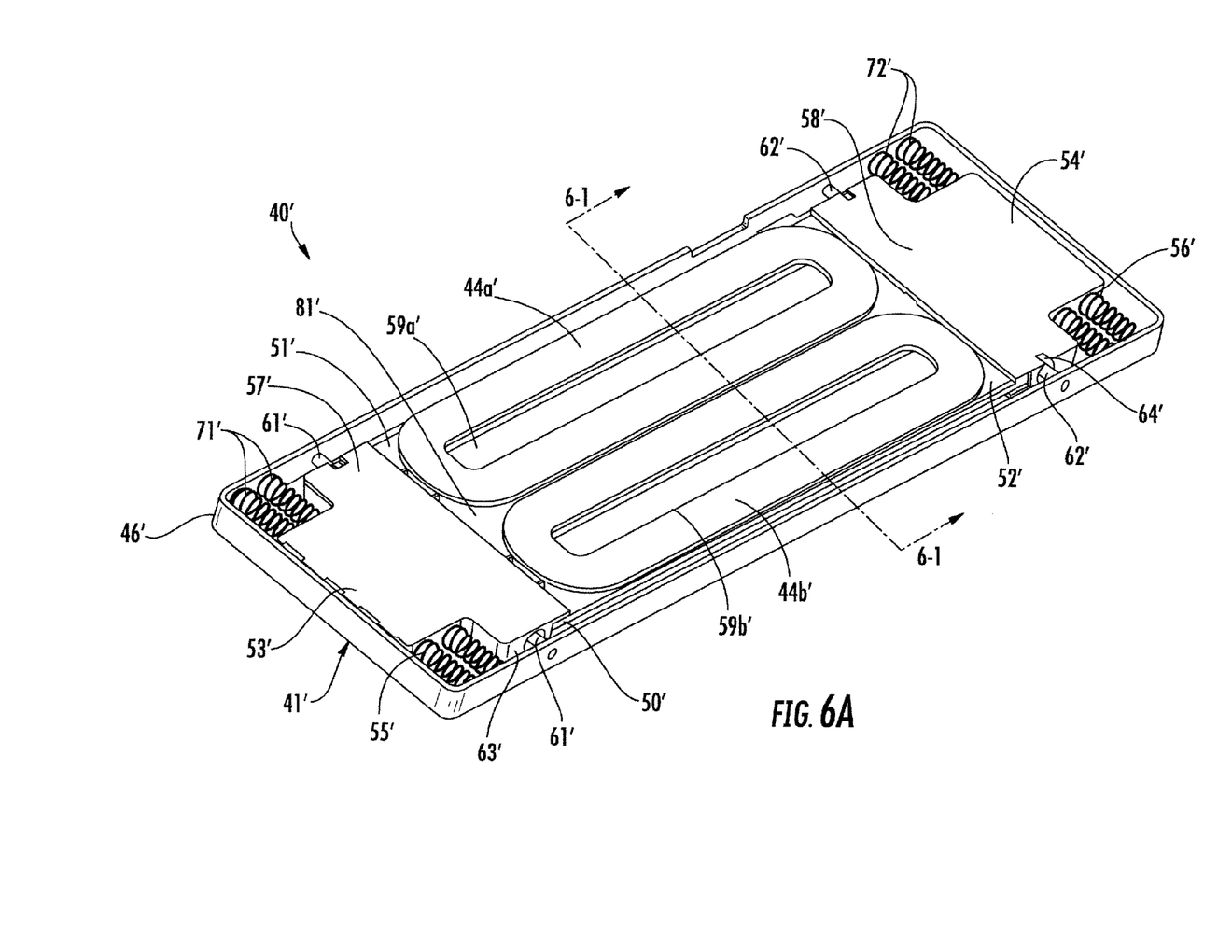
FIG. 6a is a perspective view of a portion of a haptic actuator according to another embodiment.
Figure 6B:
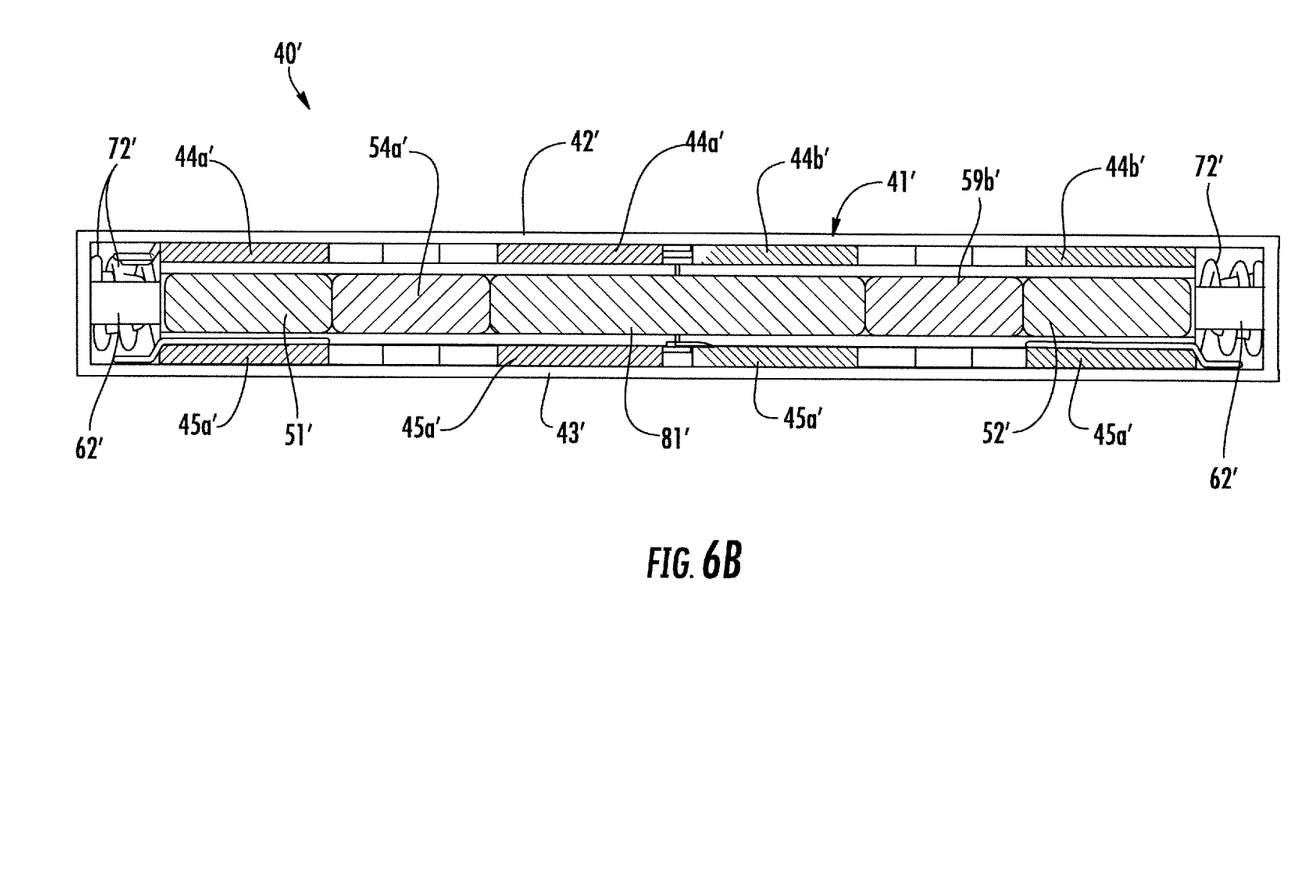
FIG. 6b is cross-sectional view of the portion of the haptic actuator of FIG. 6a taken along line 6-1.

Referring briefly to FIGS. 6a and 6b, in another embodiment, there may be more than one first and second coils. Illustratively, the haptic actuator 40' may include two first coils 44a'-44b' and two second coils 45a'-45b' to be carried by a top 42' and a bottom 43', respectively, of a housing 41' instead of a single first and second coil as described above. Each of the first and second coils 44a'-44b', 45a'-45b' have a loop shape. Of course there may be any number of first and second coils and the number of first and second coils may not be the same. First, second, and third permanent magnets 51', 52', 81' are between the first and second coils 44a'-44b', 45a'-45b'. The third mass may be in the form of two masses 59a', 59b' between the first and second masses 57', 58' and each having a reduced width relative to the first and second masses. More particularly, the two third masses 59a', 59b' may be laterally between the first and the third permanent magnets 51', 81', and the second and third permanent magnets 52', 81', respectively.

A method aspect is directed to a method of making a haptic actuator. The method includes positioning first and second coils 44, 45 to be carried by a top 42 and a bottom 43, respectively, of a housing 41. The method also includes positioning a field member 50 to be carried by the housing 41. The field member 50 includes at least one permanent magnet 51, 52 between the first and second coils 44, 45, first and second ends 53, 54, a first mass 57 between the first end and the at least one permanent magnet, and a second mass 58 between the second end and the at least one permanent magnet. The method also includes slidably coupling the first mass 57 to the housing 41 using a first shaft 61, slidably coupling the second mass 58 to the housing using a second shaft 62, and positioning a first set of biasing members 71 between the first end of the field member 50 and the housing 41. The method further includes positioning a second set of biasing members 72 between the second end 54 of the field member 50 and the housing 41.

Figure 7A:
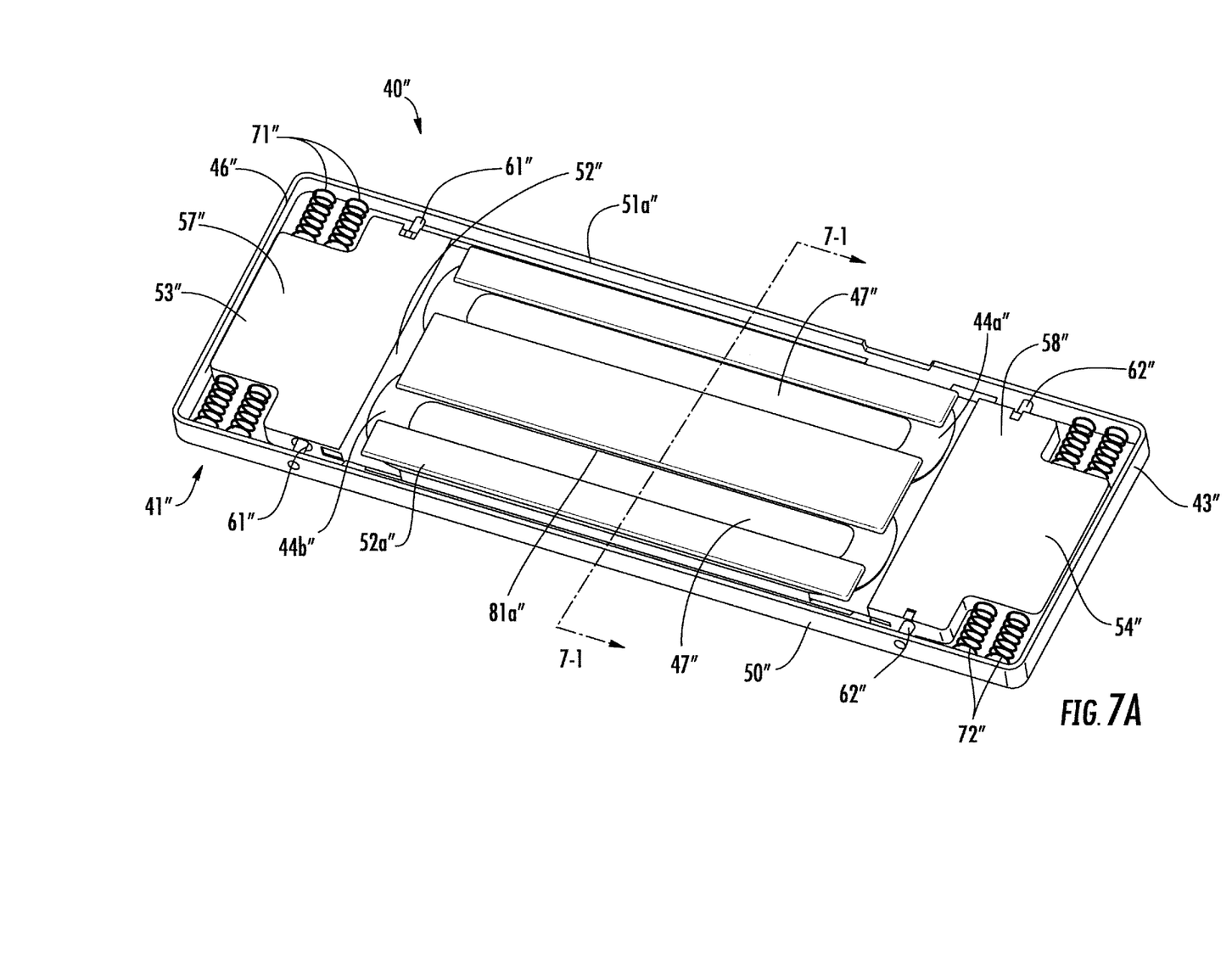
FIG. 7a is a perspective view of a portion of a haptic actuator according to another embodiment.
Figure 7B:
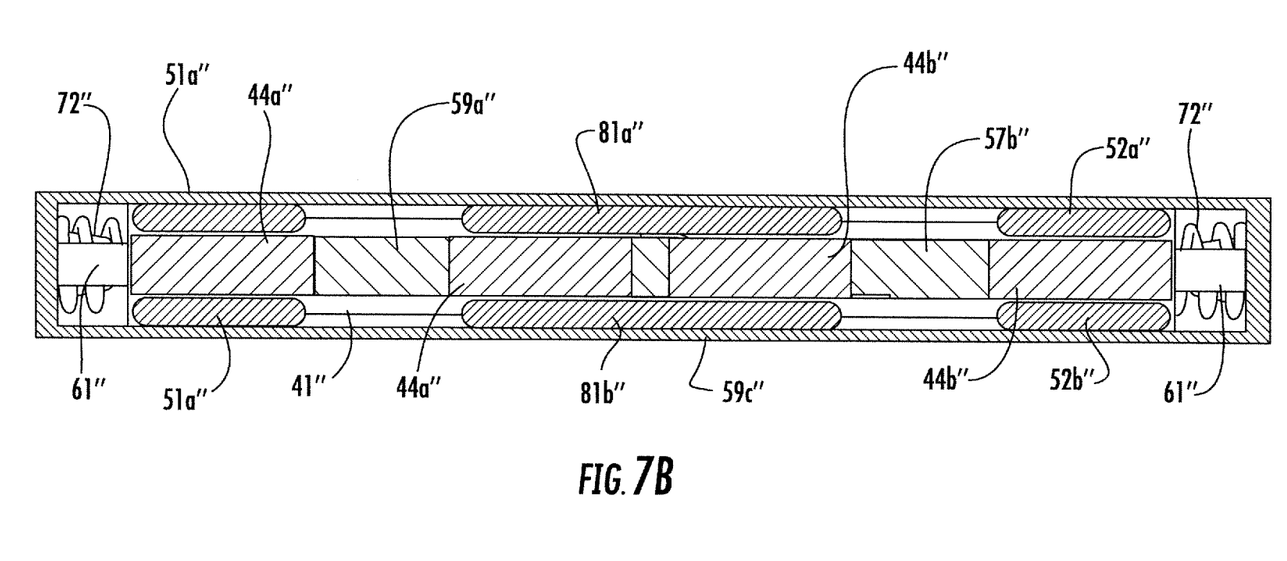
FIG. 7b is cross-sectional view of the portion of the haptic actuator of FIG. 7a taken along line 7-1.

Referring now to FIGS. 7a and 7b, in another embodiment, the haptic actuator 40" may include first, second, and third permanent magnets 51", 52", 81" carried by the actuator housing 41", and the field member 50" may include first and second coils 44a", 44b" that cooperate with the permanent magnets. In other words, in contrast to the embodiment described above with respect to FIGS. 6a and 6b, the permanent magnets 51", 52", 81" are stationary (i.e., carried by the actuator housing 41") and the coils 44a" 44b", as part of the field member 50" are moving (i.e., connected to the mass). The third mass may be in the form of three masses 59a", 59b", 59c" between the first and second masses 57", 58" and each having a reduced width relative to the first and second masses. Of course, there may be any number of coils, permanent magnets, and/or masses.

While a specific arrangement of the haptic actuator 40 has been described, it will be appreciated that in other embodiments, other configurations within the scope of the claims may be contemplated, for example, with respect to the positioning of the shafts 61, 62, bearings 63, 64, and biasing members 71, 72 (e.g., springs). Additionally, it will be appreciated that elements described in one or more of the embodiments may be used in any of the other embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. A haptic actuator comprising:
a housing having a top and a bottom;
first and second permanent magnets carried by the top and bottom, respectively, of the housing;
a field member carried by the housing and comprising at least one coil between the first and second permanent magnets,
first and second ends, and
a first mass between the first end and the at least one coil, and a second mass between the second end and the at least one coil;
a first shaft slidably coupling the first mass to the housing;
a second shaft slidably coupling the second mass to the housing;
a first set of biasing members between the first end of the field member and the housing; and
a second set of biasing members between the second end of the field member and the housing.

2. The haptic actuator of claim 1 wherein the at least one coil comprises a loop shaped coil.

3. The haptic actuator of claim 1 wherein the field member further comprises a third mass between the first and second masses and having a reduced width relative to the first and second masses.

4. The haptic actuator of claim 3 wherein the at least one coil comprises a plurality of coils adjacent the third mass.

5. The haptic actuator of claim 1 further comprising first and second mechanical bearings carried by the first and second masses and slidably receiving the first and second shafts.

6. The haptic actuator of claim 1 wherein the housing comprises at least one sidewall between the top and bottom and comprising at least one non-ferritic material.

7. The haptic actuator of claim 1 wherein the top and bottom each comprises ferritic material.

8. The haptic actuator of claim 1 further comprising a mechanical stiffener carried by one of the top and bottom of the housing.

9. The haptic actuator of claim 1 wherein the first and second sets of biasing members comprise first and second sets of springs.

10. The haptic actuator of claim 1 wherein the first and second ends of the field member comprise first and second sets of protrusions coupled to the first and second sets of biasing members, respectively.

11. The haptic actuator of claim 1 wherein each of the first and second sets of biasing members has an equal number thereof between a respective one of the first and second ends and adjacent portions of the housing.

12. An electronic device comprising:
a device housing;
wireless communications circuitry carried by the device housing;
a haptic actuator carried by the device housing and comprising
an actuator housing having a top and a bottom;
first and second permanent magnets carried by the top and bottom, respectively, of the actuator housing,
a field member carried by the actuator housing and comprising
at least one coil between the first and second permanent magnets,
first and second ends, and
a first mass between the first end and the at least one coil, and a second mass between the second end and the at least one coil,
a first shaft slidably coupling the first mass to the actuator housing,
a second shaft slidably coupling the second mass to the actuator housing,
a first set of biasing members between the first end of the field member and the actuator housing, and
a second set of biasing members between the second end of the field member and the actuator housing; and
a controller coupled to the wireless communications circuitry and the haptic actuator, and capable of performing at least one wireless communication function and selectively operating the haptic actuator.

13. The electronic device of claim 12 wherein the at least one coil comprises a loop shaped coil.

14. The electronic device of claim 12 wherein the field member further comprises a third mass between the first and second masses and having a reduced width relative to the first and second masses.

15. The electronic device of claim 14 wherein the at least one coil comprises a plurality of coils adjacent the third mass.

16. The electronic device of claim 12 further comprising first and second mechanical bearings carried by the first and second masses and slidably receiving the first and second shafts.

17. A method of making a haptic actuator comprising:
positioning first and second permanent magnets to be carried by a top and a bottom, respectively, of a housing;
positioning a field member to be carried by the housing, the field member comprising at least one coil between the first and second permanent magnets, first and second ends, and a first mass between the first end and the at least one coil, and a second mass between the second end and the at least one coil;
slidably coupling the first mass to the housing using a first shaft;
slidably coupling the second mass to the housing using a second shaft;
positioning a first set of biasing members between the first end of the field member and the housing; and
positioning a second set of biasing members between the second end of the field member and the housing.

18. The method of claim 17 wherein the at least one coil comprises a loop shaped coil.

19. The method of claim 17 wherein positioning the field member comprises positioning the field member comprising a third mass between the first and second masses and having a reduced width relative to the first and second masses.

20. The method of claim 19 wherein the at least one coil comprises a plurality of coils adjacent the third mass.

21. The method of claim 17 further comprising coupling first and second mechanical bearings to the first and second masses and to slidably receive the first and second shafts.

* * * * *